United States Patent
Kometani et al.

(10) Patent No.: US 12,142,985 B2
(45) Date of Patent: Nov. 12, 2024

(54) STATOR WITH SLOTS HAVING COOLING PORTIONS BETWEEN COILS AND MAGNETS INSTALLED THEREIN AND CORRESPONDING ROTARY ELECTRIC MACHINE

(71) Applicant: Mitsubishi Electric Corporation, Tokyo (JP)

(72) Inventors: Haruyuki Kometani, Tokyo (JP); Ryoji Miyatake, Tokyo (JP); Takuro Yamada, Tokyo (JP); Kenji Tanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 202 days.

(21) Appl. No.: 17/779,560

(22) PCT Filed: Jan. 21, 2020

(86) PCT No.: PCT/JP2020/001813
§ 371 (c)(1),
(2) Date: May 25, 2022

(87) PCT Pub. No.: WO2021/149128
PCT Pub. Date: Jul. 29, 2021

(65) Prior Publication Data
US 2022/0416639 A1    Dec. 29, 2022

(51) Int. Cl.
*H02K 49/00* (2006.01)
*H02K 3/24* (2006.01)
(Continued)

(52) U.S. Cl.
CPC ............ *H02K 49/102* (2013.01); *H02K 3/24* (2013.01); *H02K 16/02* (2013.01)

(58) Field of Classification Search
CPC ............ H02K 1/17; H02K 1/185; H02K 1/20; H02K 3/24; H02K 3/487; H02K 310/64;
(Continued)

(56) References Cited

U.S. PATENT DOCUMENTS

| 1,150,022 A | * | 8/1915 | Field | H02K 3/487 310/214 |
| 1,260,674 A | * | 3/1918 | Jackson | H02K 3/487 310/214 |

(Continued)

FOREIGN PATENT DOCUMENTS

| JP | 62-213559 A | 9/1987 |
| JP | 2016-135014 A | 7/2016 |
| JP | 2019-161738 A | 9/2019 |

OTHER PUBLICATIONS

International Search Report and Written Opinion mailed on Apr. 7, 2020, received for PCT Application PCT/JP2020/001813, Filed on Jan. 21, 2020, 8 pages including English Translation.
(Continued)

*Primary Examiner* — Maged M Almawri
(74) *Attorney, Agent, or Firm* — XSENSUS LLP

(57) ABSTRACT

A stator includes: a stator core including a plurality of stator teeth in a circumferential direction with respect to a center of rotation of a rotary electric machine; a stator coil disposed on a bottom portion side of each of a plurality of stator slots formed between the stator teeth; and a stator magnet disposed on an opening side of each of the plurality of stator slots and having the same polarity in a radial direction. In each of the stator slots, a cooling portion is provided between the stator coil and the stator magnet.

11 Claims, 6 Drawing Sheets

(51) Int. Cl.
*H02K 16/02* (2006.01)
*H02K 49/10* (2006.01)

(58) Field of Classification Search
CPC ...... H02K 310/65; H02K 310/58; H02K 9/06; H02K 9/19
USPC .. 310/154.02, 154.01, 154, 13, 154.32, 214, 310/215, 155, 154.13
See application file for complete search history.

(56) References Cited

U.S. PATENT DOCUMENTS

| | | | |
|---|---|---|---|
| 1,268,020 A * | 5/1918 | Kuyser | H02K 9/227 310/64 |
| 1,494,047 A * | 5/1924 | Williamson | H02K 1/20 310/216.118 |
| 2,661,434 A * | 12/1953 | Kilbourne | H02K 9/00 310/64 |
| 2,664,512 A * | 12/1953 | Huntley | H02K 3/24 310/64 |
| 2,727,161 A * | 12/1955 | Kilner | H02K 3/22 310/64 |
| 2,745,030 A * | 5/1956 | Baldwin | H02K 3/487 310/214 |
| 3,119,033 A * | 1/1964 | Horsley | H02K 3/24 310/214 |
| 3,408,516 A * | 10/1968 | Kudlacik | H02K 3/487 310/195 |
| 3,437,858 A * | 4/1969 | White | H02K 3/487 174/DIG. 19 |
| 3,440,462 A * | 4/1969 | Willyoung | H02K 3/487 310/58 |
| 3,444,407 A * | 5/1969 | Yates | H02K 3/48 174/DIG. 20 |
| 3,488,532 A * | 1/1970 | Anderson | H02K 9/20 310/58 |
| 3,517,232 A * | 6/1970 | Kazuo | H02K 3/24 310/59 |
| 3,862,445 A * | 1/1975 | Volkrodt | H02K 23/24 310/181 |
| 3,949,255 A * | 4/1976 | Brown | H02K 3/487 310/214 |
| 3,984,711 A * | 10/1976 | Kordik | H02K 37/20 310/154.07 |
| 4,152,610 A * | 5/1979 | Wallenstein | H02K 3/24 310/59 |
| 4,179,635 A * | 12/1979 | Beermann | H02K 3/487 310/214 |
| 4,228,375 A * | 10/1980 | Beermann | H02K 3/47 310/194 |
| 4,282,450 A * | 8/1981 | Eckels | H02K 55/04 336/DIG. 1 |
| 4,298,812 A * | 11/1981 | Damiron | H02K 3/24 310/55 |
| 4,308,476 A * | 12/1981 | Schuler | H02K 3/40 310/213 |
| 4,385,252 A * | 5/1983 | Butman, Jr. | H02K 3/48 310/214 |
| 4,634,911 A * | 1/1987 | Studniarz | H02K 3/32 310/214 |
| 4,667,125 A * | 5/1987 | Kaminski | H02K 3/48 310/214 |
| 4,739,202 A | 4/1988 | Hatanaka et al. | |
| 4,827,597 A * | 5/1989 | Hein | H02K 3/493 29/609 |
| 5,258,681 A * | 11/1993 | Hibino | H02K 3/493 310/214 |
| 5,325,008 A * | 6/1994 | Grant | H02K 3/48 29/446 |
| 5,329,197 A * | 7/1994 | Kudlacik | H02K 3/24 310/198 |
| 5,489,810 A * | 2/1996 | Ferreira | H02K 1/32 310/58 |
| 5,519,269 A * | 5/1996 | Lindberg | H02K 9/197 310/58 |
| 5,698,924 A * | 12/1997 | Nishida | H02K 1/32 310/59 |
| 5,821,652 A * | 10/1998 | Hyypio | H02K 11/0141 310/83 |
| 5,854,525 A * | 12/1998 | Pommelet | H02K 5/128 310/214 |
| 5,866,964 A * | 2/1999 | Li | H02K 19/103 318/701 |
| 6,121,708 A * | 9/2000 | Muller | H02K 3/487 310/59 |
| 6,252,325 B1 * | 6/2001 | Nashiki | H02K 19/103 310/155 |
| 6,262,503 B1 * | 7/2001 | Liebman | H01F 27/2876 310/58 |
| 6,268,668 B1 * | 7/2001 | Jarczynski | H02K 3/24 310/52 |
| 6,278,217 B1 * | 8/2001 | Kliman | H02K 15/085 310/179 |
| 6,856,053 B2 * | 2/2005 | LeFlem | H02K 3/47 310/194 |
| 7,242,119 B2 * | 7/2007 | Gomes De Lima | H02K 3/24 310/52 |
| 7,859,146 B2 * | 12/2010 | Robinson | H02K 3/24 310/58 |
| 7,868,506 B2 * | 1/2011 | Hoang | H02K 1/148 310/154.11 |
| 7,973,446 B2 * | 7/2011 | Calley | H02K 21/125 310/216.061 |
| 8,040,002 B2 * | 10/2011 | Tartaglione | H02K 3/22 310/201 |
| 8,362,661 B2 * | 1/2013 | DeBlock | H02K 1/20 310/59 |
| 8,847,445 B2 * | 9/2014 | Kowalski | H02K 1/32 310/58 |
| 8,941,281 B2 * | 1/2015 | Kabata | H02K 3/487 310/58 |
| 9,106,122 B2 * | 8/2015 | Fahimi | H02K 19/06 |
| 9,413,213 B2 * | 8/2016 | Lee | H02K 19/103 |
| 9,590,457 B2 * | 3/2017 | Hattori | H02K 3/16 |
| 9,729,020 B2 * | 8/2017 | Pal | H02K 3/24 |
| 10,014,738 B2 * | 7/2018 | Tojima | H02K 49/102 |
| 10,110,079 B2 * | 10/2018 | Gehrke | H02K 11/042 |
| 10,236,737 B2 * | 3/2019 | Röer | H02K 3/24 |
| 10,348,174 B2 * | 7/2019 | Asano | H02K 1/17 |
| 11,258,322 B2 * | 2/2022 | Karmaker | H02K 1/26 |
| 11,411,444 B2 * | 8/2022 | Lin | H02K 37/14 |
| 11,451,103 B2 * | 9/2022 | E Silva | H02K 3/30 |
| 2004/0084975 A1 * | 5/2004 | Thiot | H02K 1/20 310/58 |
| 2004/0135441 A1 * | 7/2004 | Groening | H02K 1/20 310/58 |
| 2005/0162025 A1 * | 7/2005 | Sivasubramaniam | H02K 3/14 310/201 |
| 2005/0200212 A1 * | 9/2005 | Lima | H02K 1/20 310/59 |
| 2007/0182258 A1 * | 8/2007 | Klaussner | H02K 3/50 310/58 |
| 2008/0030092 A1 * | 2/2008 | Rolando Avila Cusicanqui | H02K 21/44 310/154.02 |
| 2008/0169718 A1 * | 7/2008 | Bott | H02K 21/44 310/155 |
| 2009/0121557 A1 * | 5/2009 | Yang | H02K 23/22 310/154.02 |
| 2010/0019626 A1 * | 1/2010 | Stout | H02K 3/50 310/214 |
| 2010/0162560 A1 * | 7/2010 | Lape | H02K 15/0006 310/214 |
| 2012/0217827 A1 * | 8/2012 | Takeuchi | H02K 3/30 310/154.02 |
| 2012/0306298 A1 * | 12/2012 | Kim | H02K 16/00 310/46 |
| 2014/0265693 A1 * | 9/2014 | Gieras | H02P 9/34 310/154.02 |

(56) References Cited

U.S. PATENT DOCUMENTS

| | | | | |
|---|---|---|---|---|
| 2014/0300220 A1* | 10/2014 | Marvin | .................... | H02K 3/24 |
| | | | | 29/596 |
| 2015/0091398 A1* | 4/2015 | Bradfield | ................. | H02K 3/24 |
| | | | | 29/596 |
| 2015/0372566 A1* | 12/2015 | Airoldi | ................... | F03D 80/80 |
| | | | | 290/55 |
| 2016/0006304 A1* | 1/2016 | Tojima | ................. | H02K 1/2706 |
| | | | | 310/154.02 |
| 2021/0036568 A1* | 2/2021 | Schulz | ..................... | H02K 3/12 |
| 2021/0044160 A1* | 2/2021 | Leiber | .................... | H02K 1/148 |
| 2023/0198319 A1* | 6/2023 | Yamada | ................... | H02K 1/16 |
| | | | | 310/114 |
| 2023/0318386 A1* | 10/2023 | Hashimoto | ............ | H02K 1/165 |
| | | | | 310/214 |

OTHER PUBLICATIONS

Extended European search report issued on Dec. 16, 2022, in corresponding European patent Application No. 20916207.2, 8 pages.

\* cited by examiner

STATOR WITH SLOTS HAVING COOLING PORTIONS BETWEEN COILS AND MAGNETS INSTALLED THEREIN AND CORRESPONDING ROTARY ELECTRIC MACHINE

CROSS-REFERENCE TO RELATED APPLICATIONS

The present application is based on PCT filing PCT/JP2020/001813, filed Jan. 21, 2020, the entire contents of which are incorporated herein by reference.

TECHNICAL FIELD

The present disclosure relates to a stator and a rotary electric machine using the same.

BACKGROUND ART

Conventionally, a mechanical transmission in which a rotary electric machine is connected to a rotary shaft provided at the center of rotation and which reduces the rotation of the rotary electric machine has been used for applications that require low-speed drive. In the case where a mechanical transmission is used, mechanical wear or the like occurs in the transmission, so that regular maintenance is required. On the other hand, a rotary electric machine that can change the rotation speed of a rotor in a non-contact manner is disclosed as a magnetic wave gear device or a magnetic geared generator (see, for example, Patent Document 1).

The magnetic wave gear device disclosed in Patent Document 1 includes a stator, a first rotor which rotates at a low speed, and a second rotor which rotates at a high speed in accordance with a gear ratio, in order from the outer circumferential side with a rotary shaft as a center. The stator has a stator coil which can output generated power or allows generated torque to be controlled. When the rotary electric machine is used, the rotation speed of the rotor can be changed in a non-contact manner, so that maintenance due to mechanical wear or the like is unnecessary, and the burden of maintenance can be reduced. In addition, when the rotary electric machine is used as a generator, speed change and power generation are possible with one rotary electric machine without a mechanical transmission, the size of a power generation system is reduced, and space saving can be achieved.

CITATION LIST

Patent Document

Patent Document 1: Japanese Laid-Open Patent Publication No. 2016-135014

SUMMARY OF THE INVENTION

Problems to be Solved by the Invention

In the structure of the rotary electric machine in Patent Document 1, the stator has a stator core having a plurality of stator slots, and both a stator coil and a stator magnet are stored in each stator slot, so that both speed change and power generation can be performed with one rotary electric machine. In addition, a chip portion which is a magnetic body is provided as a back yoke at a part on the stator coil side of the stator magnet so as to project from a wall surface of the stator slot, so that output increase is achieved. However, the stator magnet disposed on the opening side so as to be opposed to the first rotor and the stator coil disposed on the bottom portion side of the stator slot are close to each other in the stator slot, so that the temperature of the stator magnet may become high due to the influence of heat generation by Joule loss of the stator coil through which a current flows. In addition, in the case where the chip portion is provided, the heat generated in the stator coil is transmitted to the stator magnet through the chip portion, so that the temperature of the stator magnet may become high.

When the temperature of the stator magnet becomes high, since a permanent magnet used as the stator magnet has characteristics that a residual magnetic flux density decreases as the temperature thereof increases, the magnetic force of the permanent magnet decreases as the temperature thereof increases, thus causing a problem that the performance of the stator deteriorates and the output of the rotary electric machine decreases. In addition, when the temperature of the permanent magnet becomes high, although there is a difference depending on the type of the permanent magnet used, if the temperature of the permanent magnet exceeds the permissible temperature, thermal demagnetization occurs, thus causing a problem that the performance of the stator deteriorates due to the decrease in magnetic force, and the reliability of the rotary electric machine is impaired.

The present disclosure has been made to solve the above problems, and an object of the present disclosure is to obtain a stator that suppresses a rise in the temperature of each stator magnet.

Solution to the Problems

A stator according to the present disclosure is a stator including: a stator core including a plurality of stator teeth in a circumferential direction with respect to a center of rotation of a rotary electric machine; a stator coil disposed on a bottom portion side of each of a plurality of stator slots formed between the stator teeth; and a stator magnet disposed on an opening side of each of the plurality of stator slots and having the same polarity in a radial direction, wherein, in each of the stator slots, a cooling portion is provided between the stator coil and the stator magnet, the cooling portion is interposed between a plate-shaped first fixing member and a plate-shaped second fixing member which are spaced apart from each other, the first fixing member is provided between the cooling portion and the stator coil so as to be fitted to opposed two wall surfaces of the stator slot, and the second fixing member is provided between the cooling portion and the stator magnet so as to be fitted to the opposed two wall surfaces of the stator slot.

Effect of the Invention

In the stator according to the present disclosure, it is possible to suppress a rise in the temperature of each stator magnet.

DESCRIPTION OF EMBODIMENTS

Figure 1:
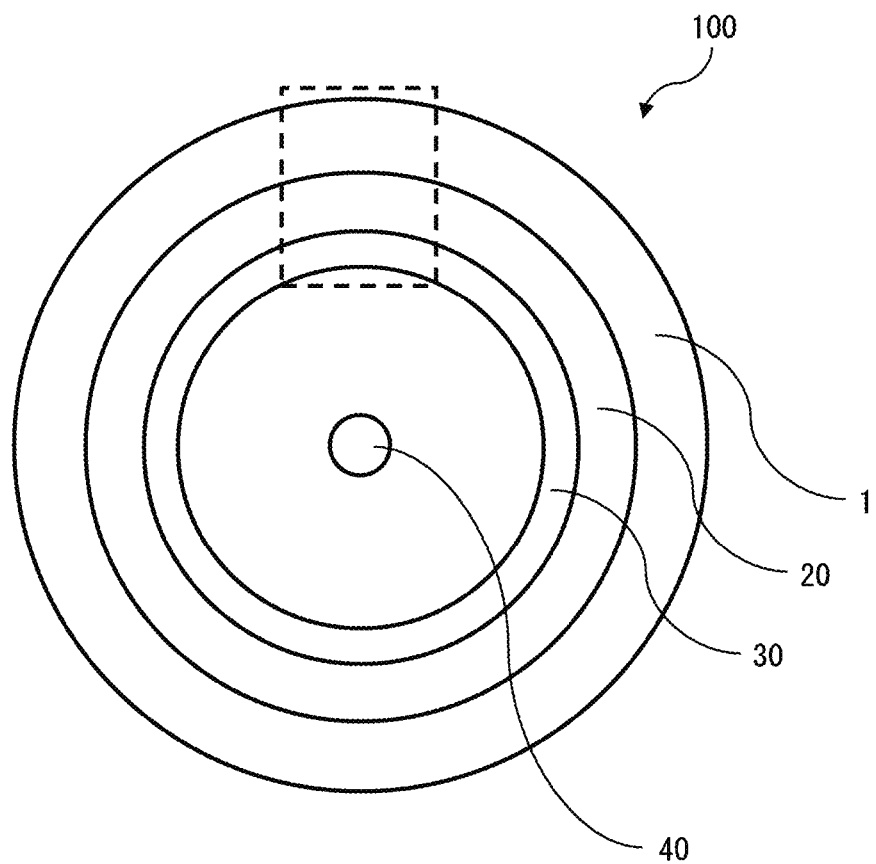
FIG. 1 is a schematic diagram showing a cross-section of a rotary electric machine according to Embodiment 1.

Hereinafter, stators according to embodiments of the present disclosure and rotary electric machines using the same will be described with reference to the drawings. In the drawings, the same or corresponding members and parts are denoted by the same reference characters to give description.

Embodiment 1

Figure 2:
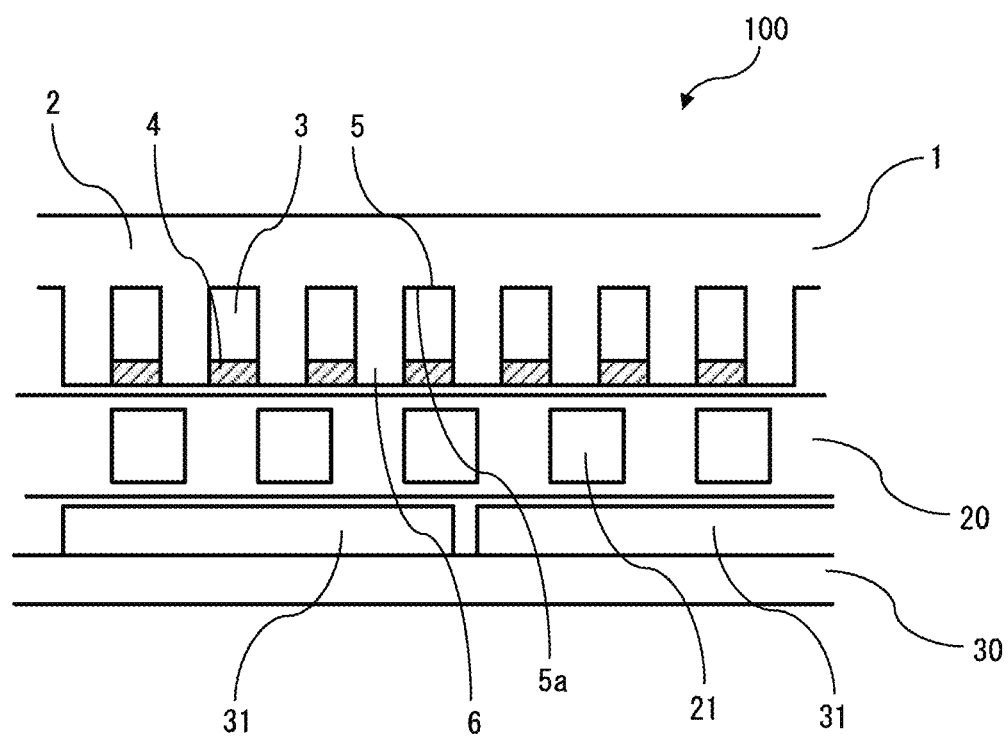
FIG. 2 is a schematic diagram showing a major part of the rotary electric machine according to Embodiment 1.

FIG. 1 is a schematic diagram showing a cross-section of a rotary electric machine 100, and FIG. 2 is a schematic diagram showing a major part of the rotary electric machine 100. FIG. 2 is an enlarged view of a portion surrounded by a broken line in FIG. 1. As shown in FIG. 1, the rotary electric machine 100 includes: an annular stator 1 which surrounds a rotary shaft 40 which is at the center of rotation of the rotary electric machine 100; a low-speed rotor 20 which is a first rotor provided coaxially with the stator 1; and a high-speed rotor 30 which is a second rotor provided coaxially with the low-speed rotor 20 so as to be opposed to the low-speed rotor 20. First, a general structure and operation of a magnetic geared generator as the rotary electric machine 100 will be described.

As shown in FIG. 2, the stator 1 includes a stator core 2, a stator coil 3, and stator magnets 4. The annular stator core 2 includes a plurality of stator teeth 6 provided at equal intervals in the circumferential direction with respect to the center of rotation of the rotary electric machine 100. A plurality of stator slots 5 formed between the stator teeth 6 each include the stator coil 3 and the stator magnet 4. The stator coil 3 is disposed on a bottom portion 5a side of the stator slot 5. The stator magnet 4 is disposed on the opening side of the stator slot 5. The stator magnets 4 are all magnetized in the same direction in the radial direction. Each stator magnet 4 is, for example, a neodymium sintered magnet, but is not limited thereto. When the radially inner side of the stator magnet 4 is an N pole, the radially inner side of each stator tooth 6 adjacent thereto is an S pole, and pole pairs, the number Ns of which is equal to the number of stator slots 5, are formed.

The low-speed rotor 20 is provided on the inner circumferential side of the stator 1 so as to be opposed to the stator magnets 4 across a minute gap. The low-speed rotor 20 has a plurality of magnetic pole pieces 21 arranged at equal intervals in the circumferential direction, and rotates at a low speed by external power. The number of magnetic pole pieces 21 is denoted by NL. The high-speed rotor 30 is provided on the inner circumferential side of the low-speed rotor 20. The high-speed rotor 30 has high-speed rotor magnets 31 which are a plurality of permanent magnets and provided on an outer circumferential portion thereof at equal intervals, and pole pairs, the number of which is Nh, are formed.

If the relationship between Ns, NL, and Nh satisfies NL=Ns±Nh, a negative torque is generated in the low-speed rotor 20 due to the interaction between the magnetic forces of the stator magnets 4 and the high-speed rotor magnets 31.

On the other hand, by rotating the low-speed rotor 20 by external power, an input can be obtained at the low-speed rotor 20. If a stator current is applied to the stator coil 3 such that the high-speed rotor 30 freely runs with respect to the input of the low-speed rotor 20, the high-speed rotor 30 rotates at a rotation speed that is NL/Nh times that of the low-speed rotor 20. When the high-speed rotor 30 rotates at a speed that is NL/Nh times that of the low-speed rotor 20, an induced electromotive force is generated in the stator coil 3. Due to the generation of the induced electromotive force, generated power is outputted from the stator coil 3.

Figure 3:
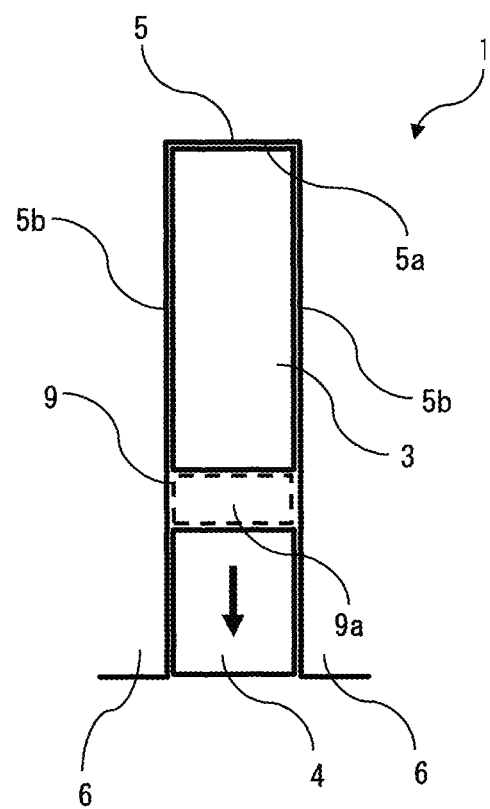
FIG. 3 is a schematic diagram showing a cross-section of a stator slot of the rotary electric machine according to Embodiment 1.

The internal configuration of the stator slot 5 which is a major part of the present disclosure will be described. FIG. 3 is a schematic diagram showing a cross-section of the stator slot 5 of the rotary electric machine 100 according to Embodiment 1. Each stator slot 5 includes the stator coil 3, the stator magnet 4, and a cooling portion 9 between the stator coil 3 and the stator magnet 4. Here, the cooling portion 9 is a ventilation passage 9a through which gas passes. The stator coil 3 and the stator magnet 4 are opposed to each other across the ventilation passage 9a. Each stator magnet 4 is magnetized so as to have the same polarity in the radial direction. For example, the direction of an arrow shown in FIG. 3 is the magnetization direction. The stator coil 3 and the stator magnet 4 are fixed, for example, so as to be adhered to wall surfaces 5b of the stator slot 5, but the fixing method therefor is not limited thereto.

The reason why the cooling portion 9 is provided will be described. When a current flows through the stator coil 3, heat is generated in the stator coil 3 due to Joule loss. Since the stator coil 3 and the stator magnet 4 are provided inside each stator slot 5, the heat generated in the stator coil 3 is conducted to the stator magnet 4, and the temperature of the stator magnet 4 rises. When the temperature of the stator magnet 4 becomes high, since the permanent magnet used as the stator magnet 4 has characteristics that a residual magnetic flux density decreases as the temperature thereof increases, the magnetic force of the permanent magnet decreases as the temperature thereof increases. In addition, when the temperature of the permanent magnet becomes high, although there is a difference depending on the type of the permanent magnet used, if the temperature of the permanent magnet exceeds the permissible temperature, thermal demagnetization occurs, so that the magnetic force of the permanent magnet decreases. When the magnetic force of the stator magnet 4 decreases, the performance of the stator 1 deteriorates, and the output of the rotary electric machine 100 decreases. In order to suppress a rise in the temperature of the stator magnet 4, the cooling portion 9 is provided between the stator coil 3 and the stator magnet 4. If a rise in the temperature of the stator magnet 4 is suppressed by providing the cooling portion 9, the performance of the stator 1 does not deteriorate, and the output of the rotary electric machine 100 is maintained, so that the reliability of the rotary electric machine 100 is improved. In addition, if the stator magnet 4 is cooled by providing the cooling portion 9, the magnetic force of the stator magnet 4 is improved to improve the performance of the stator 1, so that the output of the rotary electric machine 100 can be improved.

The ventilation passage 9a which is the cooling portion 9 will be described. By passing gas through the ventilation passage 9a, the heat generated in the stator coil 3 is decreased, and is also diffused, so that a rise in the temperature of the stator magnet 4 is suppressed. Gas is passed through the ventilation passage 9a, for example, by sending wind generated by rotation of a fan, which is attached to the rotary shaft 40, to the ventilation passage 9a, but the method for passing gas through the ventilation passage 9a is not limited thereto.

As described above, in the stator 1 according to Embodiment 1, since the ventilation passage 9a which is the cooling portion 9 is provided between the stator coil 3 and each stator magnet 4, a rise in the temperature of each stator magnet 4 included in the stator 1 can be suppressed. In addition, since a rise in the temperature of each stator magnet 4 is suppressed, the deterioration of the performance of the stator 1 can be suppressed, and the output of the rotary electric machine 100 is maintained, so that the reliability of the rotary electric machine 100 can be improved. Moreover, since each stator magnet 4 is cooled, the magnetic force of the stator magnet 4 is improved to improve the performance of the stator 1, so that the output of the rotary electric machine 100 can be improved.

Embodiment 2

Figure 4:
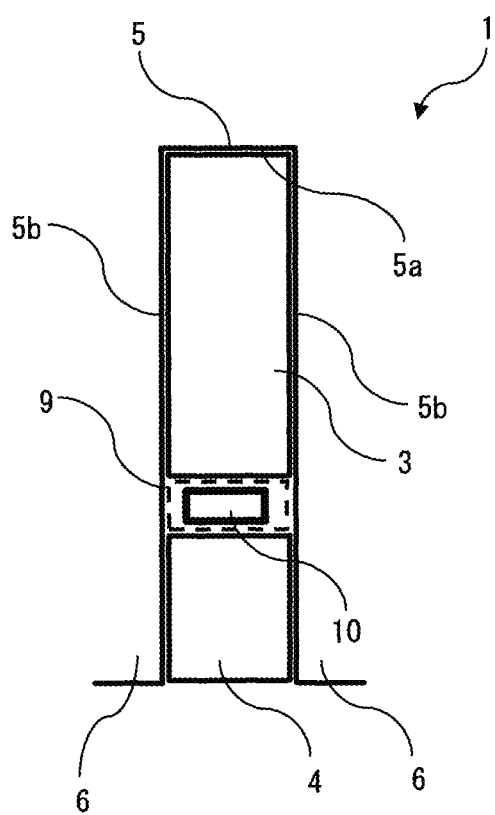
FIG. 4 is a schematic diagram showing a cross-section of a stator slot of a rotary electric machine according to Embodiment 2.

A stator 1 according to Embodiment 2 will be described. FIG. 4 is a schematic diagram showing a cross-section of a stator slot 5 of a rotary electric machine 100. The stator 1 according to Embodiment 2 has a configuration in which a tube through which fluid flows is provided at a cooling portion 9.

The stator slot 5 includes a stator coil 3, a stator magnet 4, and the cooling portion 9 between the stator coil 3 and the stator magnet 4. Here, a tube through which fluid flows is provided as the cooling portion 9. The tube through which fluid flows is, for example, a vent tube 10. The vent tube 10 is passed between the stator coil 3 and the stator magnet 4 in an axial direction perpendicular to the drawing sheet of FIG. 4. The stator coil 3 and the stator magnet 4 are opposed to each other across the vent tube 10.

In order to suppress a rise in the temperature of the stator magnet 4, an oil or water having a temperature that is at least equal to or lower than the temperature of the stator magnet 4 which is desired to be maintained, is caused to flow through the vent tube 10. By passing these fluids through the vent tube 10, the heat generated in the stator coil 3 is decreased, so that a rise in the temperature of the stator magnet 4 is suppressed. Depending on the temperature of the flowing fluid, the stator magnet 4 is cooled. The fluid passing through the vent tube 10 is not limited to the oil or water, and may be another liquid or gas.

As described above, in the stator 1 according to Embodiment 2, since the vent tube 10 through which fluid flows is provided as the cooling portion 9 between the stator coil 3 and the stator magnet 4, a rise in the temperature of each stator magnet 4 included in the stator 1 can be suppressed. In addition, since a rise in the temperature of each stator magnet 4 is suppressed, the deterioration of the performance of the stator 1 can be suppressed, and the output of the rotary electric machine 100 is maintained, so that the reliability of the rotary electric machine 100 can be improved. Moreover, since each stator magnet 4 is cooled, the magnetic force of the stator magnet 4 is improved to improve the performance of the stator 1, so that the output of the rotary electric machine 100 can be improved.

Embodiment 3

Figure 5:
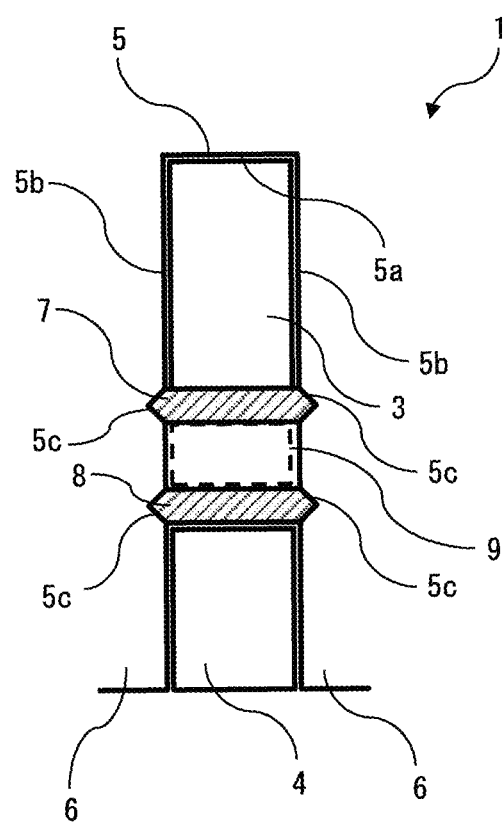
FIG. 5 is a schematic diagram showing a cross-section of a stator slot of a rotary electric machine according to Embodiment 3.

A stator 1 according to Embodiment 3 will be described. FIG. 5 is a schematic diagram showing a cross-section of a stator slot 5 of a rotary electric machine 100. The stator 1 according to Embodiment 3 has a configuration in which two wedges are disposed between a stator coil 3 and a stator magnet 4.

The stator slot 5 includes the stator coil 3, the stator magnet 4, and a cooling portion 9 between the stator coil 3 and the stator magnet 4. The cooling portion 9 is interposed between a first wedge 7 which is a plate-shaped first fixing member and a second wedge 8 which is a plate-shaped second fixing member, and these fixing members are spaced apart from each other. The first wedge 7 is provided between the cooling portion 9 and the stator coil 3 so as to be fitted to opposed two wall surfaces 5b of the stator slot 5. The second wedge 8 is provided between the cooling portion 9 and the stator magnet 4 so as to be fitted to the opposed two wall surfaces 5b of the stator slot 5. The first wedge 7 and the second wedge 8 are made of, for example, a resin, but the materials of the first wedge 7 and the second wedge 8 are not limited thereto. The stator coil 3 and the stator magnet 4 are opposed to each other across the cooling portion 9.

The stator coil 3 is stably fixed at a bottom portion 5a of the stator slot 5 by fixing the first wedge 7 so as to be fitted to cutouts 5c. The position at which the stator magnet 4 is fixed by the second wedge 8 is determined, and the stator magnet 4 is fixed so as to be adhered to the second wedge 8. In a manufacturing process for the stator 1, the first wedge 7 is provided by inserting the first wedge 7 into the cutouts 5c in an axial direction perpendicular to the drawing sheet after the stator coil 3 is inserted into the stator slot 5. Therefore, the first wedge 7 does not hamper the insertion of the stator coil 3 into the stator slot 5, and it is easy to insert the stator coil 3 into the stator slot 5. In addition, since the first wedge 7 is provided through fitting, it is easy to install the first wedge 7 into the stator slot 5, and the stator coil 3 is easily fixed in the stator slot 5.

The cooling portion 9 is configured as the ventilation passage shown in Embodiment 1 or the vent tube shown in Embodiment 2, but is not limited to these configurations, and may have another configuration as along as the configuration is a configuration capable of suppressing a rise in the temperature of the stator magnet 4 or a configuration capable of cooling the stator magnet 4.

As described above, in the stator 1 according to Embodiment 3, since the first wedge 7 and the second wedge 8 are provided between the stator coil 3 and the stator magnet 4 with the cooling portion 9 interposed therebetween, the stator coil 3 and the stator magnet 4 can be fixed in the stator slot 5 through a simple manufacturing process. In addition, since the first wedge 7 and the second wedge 8 are provided through fitting, the stator 1 can be produced through a simple manufacturing process.

Embodiment 4

Figure 6:
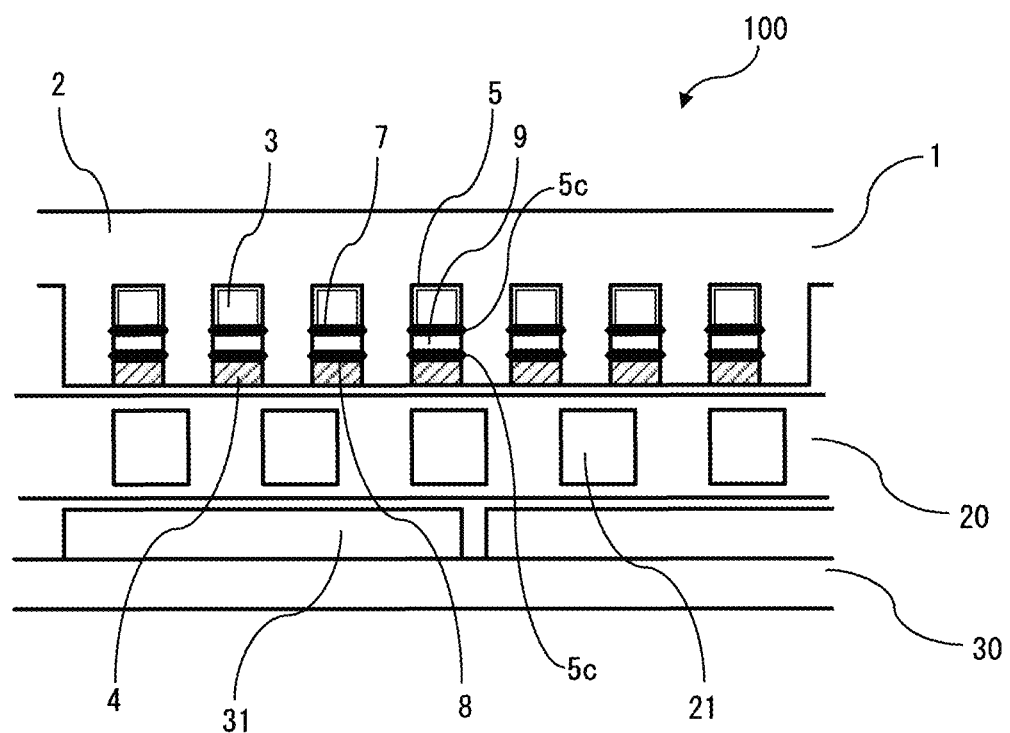
FIG. 6 is a schematic diagram showing a major part of a rotary electric machine according to Embodiment 4.

In Embodiment 4, a rotary electric machine 100 in which the stator 1 described in Embodiment 3 is used will be described. FIG. 6 is a schematic diagram showing a major part of the rotary electric machine 100. The rotary electric machine 100 according to Embodiment 4 has a configuration in which a cooling portion 9, a first wedge 7, and a second wedge 8 are provided between a stator coil 3 and a stator magnet 4 in each stator slot 5.

As shown in FIG. 6, the rotary electric machine 100 includes: an annular stator 1 which surrounds a rotary shaft (not shown) which is at the center of rotation of the rotary electric machine 100; a low-speed rotor 20 which is a first rotor having a plurality of magnetic pole pieces 21 and provided coaxially with the stator 1 so as to be opposed to the stator magnets 4; and a high-speed rotor 30 which is a second rotor having high-speed rotor magnets 31, which are a plurality of permanent magnets, and provided coaxially with the low-speed rotor 20 so as to be opposed to the low-speed rotor 20. The stator 1 includes a stator core 2, the stator coil 3, the stator magnets 4, the cooling portions 9, the first wedges 7, and the second wedges 8. The annular stator core 2 includes a plurality of stator teeth 6 provided at equal intervals in the circumferential direction with respect to the center of rotation of the rotary electric machine 100. Each stator slot 5 is formed between the stator teeth 6. Each first wedge 7 and each second wedge 8 are provided between the stator coil 3 and the stator magnet 4, with the cooling portion 9 interposed therebetween, so as to be fitted to cutouts 5c of opposed two wall surfaces 5b of the stator slot 5. In a manufacturing process for the stator 1, the first wedge 7 is provided by inserting the first wedge 7 into the cutouts 5c in an axial direction perpendicular to the drawing sheet after the stator coil 3 is inserted into the stator slot 5. Each cooling portion 9 is configured as, for example, a ventilation passage or a vent tube.

As described above, in the rotary electric machine 100 according to Embodiment 4, since the cooling portion 9 is provided between the stator coil 3 and each stator magnet 4, a rise in the temperature of each stator magnet 4 included in the stator 1 can be suppressed. In addition, since a rise in the temperature of each stator magnet 4 is suppressed, the deterioration of the performance of the stator 1 can be suppressed, and the output of the rotary electric machine 100 is maintained, so that the reliability of the rotary electric machine 100 can be improved. Moreover, since each stator magnet 4 is cooled, the magnetic force of each stator magnet 4 is improved to improve the performance of the stator 1, so that the output of the rotary electric machine 100 can be improved. Moreover, since the first wedges 7 and the second wedges 8 are provided, the stator coil 3 and the stator magnet 4 can be fixed in each stator slot 5 through a simple manufacturing process, and the rotary electric machine 100 can be produced through a simple manufacturing process. Furthermore, since each first wedge 7 and each second wedge 8 are provided through fitting, the rotary electric machine 100 can be produced through a simple manufacturing process.

Although the rotary electric machine 100 in which the stator 1 described in Embodiment 3 is used has been described above, also in a rotary electric machine 100 in which the stator 1 described in Embodiment 1 or Embodiment 2 is used, a rise in the temperature of each stator magnet 4 can be suppressed, so that the reliability of the rotary electric machine 100 can be improved. In addition, the same effects are achieved in a generator or a motor including a stator 1 having the same configuration as in the present disclosure. Moreover, although the rotary electric machines 100 in each of which the stator 1 is located at the outermost circumference have been described above, the placement of the stator 1 is not limited to the outermost circumference, and an outer rotor type rotary electric machine in which the stator 1 is located at the innermost circumference may be adopted. In the case where the stator 1 is provided at the innermost circumference, the stator core includes a plurality of stator slots which are arranged in the circumferential direction and are open toward the outer circumferential side of the rotary electric machine.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 stator
2 stator core
3 stator coil
4 stator magnet
5 stator slot
5a bottom portion
5b wall surface
5c cutout
6 stator teeth
7 first wedge
8 second wedge
9 cooling portion
9a ventilation passage
10 vent tube
20 low-speed rotor
21 magnetic pole piece
30 high-speed rotor
31 high-speed rotor magnet
40 rotary shaft
100 rotary electric machine

The invention claimed is:

1. A stator comprising:
a stator core including a plurality of stator teeth in a circumferential direction with respect to a center of rotation of a rotary electric machine;
a stator coil disposed on a bottom portion side of each of a plurality of stator slots formed between the stator teeth; and
a stator magnet disposed on an opening side of each of the plurality of stator slots and having the same polarity in a radial direction, wherein
in each of the stator slots, a cooling portion is provided between the stator coil and the stator magnet,
the cooling portion is interposed between a plate-shaped first fixing member and a plate-shaped second fixing member which are spaced apart from each other,
the first fixing member is provided between the cooling portion and the stator coil to be fitted to opposed two wall surfaces of the stator slot, and
the second fixing member is separate from the first fixing member and is provided between the cooling portion and the stator magnet to be fitted to the opposed two wall surfaces of the stator slot.

2. The stator according to claim 1, wherein the first fixing member and the second fixing member are formed of resin.

3. The stator according to claim 1, wherein the stator magnet is formed of a sintered neodymium material.

4. The stator according to claim 1, wherein the cooling portion is a ventilation passage.

5. The stator according to claim 4, wherein
the rotary electric machine includes:
the stator;
a first rotor having a plurality of magnetic pole pieces and provided coaxially with the stator so as to be opposed to the stator magnets; and
a second rotor having a plurality of permanent magnets and provided coaxially with the first rotor so as to be opposed to the first rotor.

6. The stator according to claim 1, wherein
the rotary electric machine includes:
the stator;
a first rotor having a plurality of magnetic pole pieces and provided coaxially with the stator so as to be opposed to the stator magnets; and
a second rotor having a plurality of permanent magnets and provided coaxially with the first rotor so as to be opposed to the first rotor.

7. The stator according to claim 6, wherein the rotary electric machine further includes a fan to force a gas through the cooling portion.

8. The stator according to claim 1, wherein a tube through which fluid flows is provided at the cooling portion.

9. The stator according to claim 8, wherein the rotary electric machine includes:
the stator;
a first rotor having a plurality of magnetic pole pieces and provided coaxially with the stator so as to be opposed to the stator magnets; and
a second rotor having a plurality of permanent magnets and provided coaxially with the first rotor so as to be opposed to the first rotor.

10. The stator according to claim 8, wherein the fluid is an oil.

11. The stator according to claim 8, wherein the fluid is water.

* * * * *